United States Patent [19]

Düring

[11] Patent Number: 5,080,260

[45] Date of Patent: Jan. 14, 1992

[54] SELF-SUPPORTING, STAND-UP, YET FOLDABLE PLASTIC BOTTLE, MOLD FORM FOR ITS MANUFACTURE, AND METHOD OF REDUCING ITS VOLUME WHEN EMPTY

[75] Inventor: Walter Düring, Dällikon, Switzerland

[73] Assignee: During AG, Dällikon, Switzerland

[21] Appl. No.: 550,140

[22] Filed: Jul. 9, 1990

[30] Foreign Application Priority Data

Jul. 20, 1989 [CH] Switzerland ........................ 2750/89
Oct. 19, 1989 [CH] Switzerland ........................ 3797/89

[51] Int. Cl.⁵ ............................................ B65D 35/08
[52] U.S. Cl. ........................................ 222/107; 222/215; 249/119; 425/538
[58] Field of Search ................. 222/92, 107, 206, 212, 222/215; 215/1 C; 425/538; 249/119

[56] References Cited

U.S. PATENT DOCUMENTS

| | | | |
|---|---|---|---|
| 2,368,944 | 2/1945 | Parkhurst | 222/107 |
| 3,288,334 | 11/1966 | Corsette | 222/107 |
| 3,395,836 | 8/1968 | Stahmer | 222/215 |
| 3,727,803 | 4/1973 | Cobb | 222/215 |
| 3,926,341 | 12/1975 | Lhoest | 222/107 X |
| 4,158,376 | 6/1979 | Erb | 150/5 |
| 4,674,655 | 6/1987 | Lofgrer et al. | 222/103 X |
| 4,898,306 | 2/1990 | Pardes | 222/206 |

FOREIGN PATENT DOCUMENTS

| | | | |
|---|---|---|---|
| 932302 | 8/1973 | Canada | 222/207 |
| 1278394 | 10/1961 | France | |
| 1385639 | 12/1964 | France | |
| 2288445 | 5/1976 | France | |
| 2316132 | 1/1977 | France | |

Primary Examiner—Kevin P. Shaver
Assistant Examiner—Joseph A. Kaufman
Attorney, Agent, or Firm—Frishauf, Holtz, Goodman & Woodward

[57] ABSTRACT

The bottle is made of thin-walled plastic produced by a blow-molding process; a bottom part (3) is pre-formed with an inwardly extending, in cross section essentially V-shaped folded part (13) which defines an elongated inner bottom fold line (8). The inner fold line (8) merges smoothly with body fold lines (15, 15a, 15b) extending longitudinally of the bottle. The inner bottom fold line (8) and the longitudinal fold line are in a single plane; the plane is transverse to the seam or junction lines (9) formed by molding the bottle in a two-part mold. The cross section of the bottle may be circular, rectangular, or hexagonal, and it is unitary with a pouring spout which extends, preferably with a reduced diameter, from the top portion of the bottle, so that, upon folding the bottle along the seam lines and expelling all air from the inside, the bottle can be compressed and reduced to small size upon air-tightly closing the spout.

24 Claims, 6 Drawing Sheets

SELF-SUPPORTING, STAND-UP, YET FOLDABLE PLASTIC BOTTLE, MOLD FORM FOR ITS MANUFACTURE, AND METHOD OF REDUCING ITS VOLUME WHEN EMPTY

Reference to related patents, the disclosures of which are hereby incorporated by reference:
U.S. Pat. No. 3,395,836, Stahmer;
U.S. Pat. No. 3,727,803, Cobb.
Reference to related disclosures:
French Patent Publication 2 316 132;
French Utility Certificate Publication 2 288 445;
French Patent 1 385 639.
Reference to related design patent application:
U.S. Ser. No. 07/453,471, filed Dec. 20, 1989, by the inventor hereof.

FIELD OF THE INVENTION

The present invention relates to a self-supporting, yet foldable plastic vessel, such as a bottle, to a mold form for its manufacture, and to a method to reduce the volume of the bottle, when empty, so that its shipping or disposal volume is a minimum.

BACKGROUND

Many types of forms for bottles, vessels and the like to receive liquids and viscous products are known. Such bottles should be inexpensive, use little material and, when empty, should take up as little space as possible. They should, preferably, also be reusable for refilling of the container, bottle or vessel after use. The closure should be tight so that no liquid can escape and, preferably, should be air-tight as well.

French Patent 1 385 639 discloses a foldable bottle which, before being filled, can be compressed to have a small volume for transport. The bottom and side folds are internally directed. The folding pattern does not, however, permit substantial decrease of the volume when it is empty, and this particular bottle cannot be blow-molded.

French Utility Model Publication 2 288 445 illustrates a small bottle or ampule which is constructed in form of a longitudinal bellows, having a plurality of folds. The bottle is designed for the reception of small quantities of material which, upon compression of the bellows, can be forcefully ejected, for example through an atomizer. By pressing on the side walls in a pumping action, the content of the bottle is pressed outwardly or atomized. The invention is directed not to a flat shape of an empty container but, rather, to the elastic recovery important for the pumping action. The inwardly projecting bottom folding edges merge into the inwardly projecting side folding edges.

U.S. Pat. No. 3,395,836, Stahmer, shows an outwardly circular bottle with an inwardly extending fold so that, upon compression of the side walls, the contents can be expelled by a pumping action. The fold, similar to an accordion fold is provided to permit elastic resetting after compression rather than to reduce the volume of the bottle structure, when empty. The quantity of liquid which can be retained by this bottle is decreased by the inwardly extending wedge-shaped side walls.

Blow-molding of bottles is particularly efficient, and especially when starting from a heated plastic tube or hose. Some inherent characteristics and limitations on manufacture must be considered, however, in such a production process. The wall thickness has limits. The hot hose cannot be deformed into sharp corners, nor can the material be stretched substantially for bulges or the like due to the danger of tearing. To obtain a good folding or accordion-like or bellows-like form, thickening of material at the fold line must not occur, which is difficult to obtain in production. Problems arise at any folding process, due to compression and agglomeration of material at the fold, and stretching at points remote from the fold edge.

THE INVENTION

It is an object to provide a plastic, foldable bottle, made in a blow-molding process in a single manufacturing operation, the bottle, when empty, can be folded to a minimum thickness, while using minimum amounts of material. When filled, the bottle should be self-supporting and self-standing and have a volume capacity which is as large as possible with respect to its space requirement, so that, for example on sale shelves in stores, a maximum number of such bottles, when full, can be placed at a given space. It is another object of the invention to provide a method to reduce the volume of the bottle, when empty, to a minimum, and to provide a blow-molding form which permits economical manufacture thereof.

Briefly, and with reference to an upstanding bottle, the bottom wall of the bottle has an elongated, in cross section generally V-shaped bottom fold which extends upwardly; the side walls are formed with externally extending wall fold edges; the bottom fold edge and the wall fold edges are in the same longitudinal plane of the bottle, and the bottom fold edges and the wall fold edges merge into each other.

The bottle, in accordance with the invention, has excellent foldability since the bottom fold, when the bottle is compressed, will extend inwardly, whereas the two side folds or longitudinal wall folds are outwardly directed. This construction permits making the bottle in blow-molding with comparatively low wall thickness, low use of material, and in single working step. The bottle, when filled, stands securely and does not topple over.

The arrangement has the other advantage that the cross section of the bottle can be square, hexagonal, or any polygon having a number of corners divisible by 2, so that the upwardly extending bottom fold and two opposite side wall folds will be in the same longitudinal plane and can merge into each other.

The bottle can be made in a simple blow-molding mold, and, in accordance with a feature of the invention, is made in a two-part mold in which the separating plane of the two mold halves extend transversely to the V-shaped bottom fold edge and to the longitudinal central plane defined by the longitudinal axis of the bottle.

Separating the blow mold halves in a plane which is transverse to a plane formed by the central bottom fold edge and the longitudinal axis has the result that the folding edges will have only low material thickness so that, for folding, they can be readily deformed. In conventional practice, the separating plane would be congruent with the bottom folding edge and the longitudinal plane of the longitudinal folds. This has disadvantages upon blow-molding. Upon closing the two halves of the mold, the juncture of the mold forms will result in material accumulation at the two ends of the tube which is compressed. Such accumulation of material then results in thickening, of approximately half-moon shape, extending transversely to the compression or pinching edge. Such thickening substantially impedes folding when the bottle is made.

In accordance with a feature of the invention, the closure is essentially air-tight so that, upon loosening of the closure, the bottle when empty, can be compressed, for example by hand pressure on the wall surfaces along the wall fold lines and the bottom fold line of the V-shaped upwardly or inwardly extending fold, to expel any air between the walls internally of the bottle. In the region adjacent the bottle opening or outlet, the walls will assume, roughly, the shape of a fragmentary sphere. Upon then closing the closure, the walls will not spring back, being held by the vacuum therein, so that elastic resetting of the walls will be prevented and the space taken up by the empty bottle will be a minimum.

By the method explained, which can, of course, upon manufacture also be done automatically, for example by rolling the walls towards each other, it is possible to fold the bottle to a minimum volume. The highly bowed bottom fold edge is transferred to a somewhat more stretched or straight form, and the upper end of the bottle, adjacent the outlet thereof, upon folding, will form a bulged half or part sphere, or shell, with the two side walls of the bottle closely adjacent each other. By closing the outlet openings, elastic expansion of the bottle due to the elasticity of the material is effectively prevented. The cross section of the bottle need not be polygonal; it may be circular. The inwardly extending generally V-fold of the bottom wall will, again, merge with and extend to longitudinal fold lines of the bottle wall. The juncture of blow-molding halves will be offset with respect to the longitudinal fold lines, for example be at a right angle with respect to the inwardly extending V fold and to the longitudinal wall folds.

DETAILED DESCRIPTION

The bottle, preferably, is made of a thin-walled flexible, preferably translucent or transparent plastic material. It is made in the well known blow-molding process by placing a hot plastic tube into a two-part blow mold.

Figure 1:
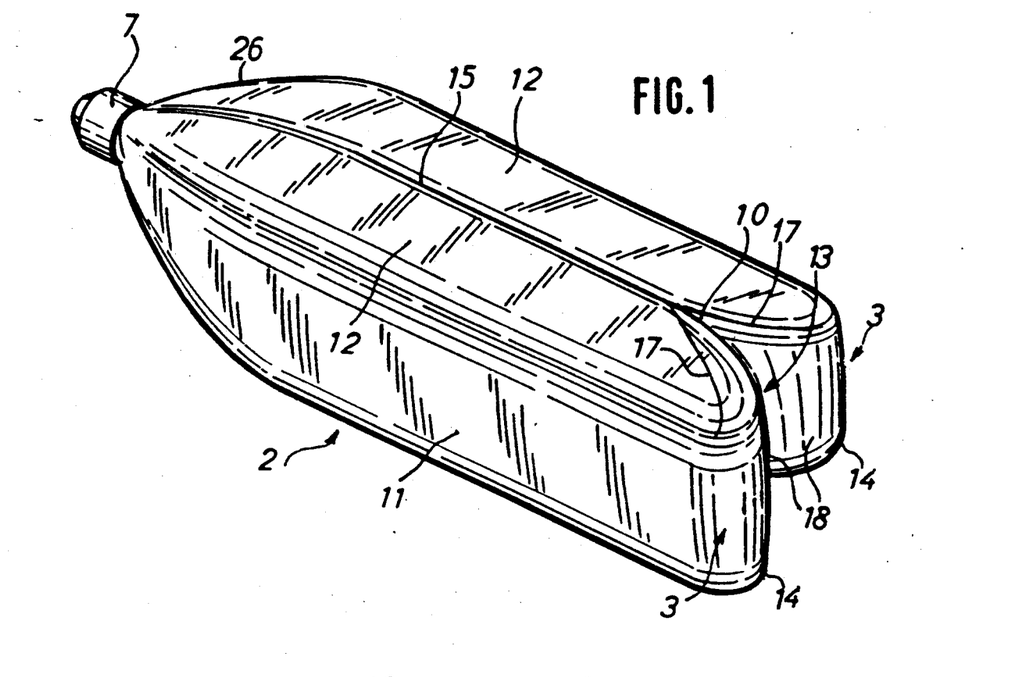
FIG. 1 is a perspective view of a first embodiment of the bottle.
Figure 2:
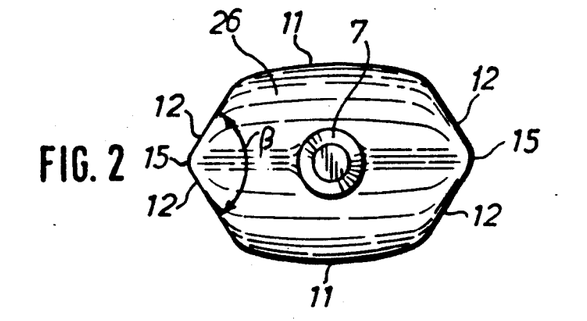
FIG. 2 is a top view of the bottle of FIG. 1.
Figure 3:
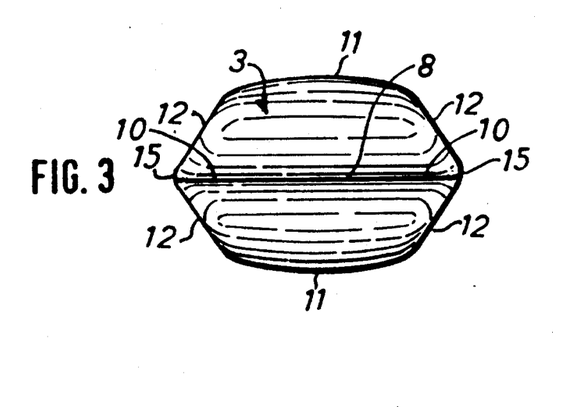
FIG. 3 is a bottom view of the bottle of FIG. 1.

Referring first to the embodiments shown in FIGS. 1-7:

The bottle of FIG. 1 is elongated and has a roughly hexagonal cross section, in which the hexagonal portions of the hexagon have two longer and four shorter sides, although this is not a necessary feature of the invention. In cross section the bottle is mirror-symmetrical with respect to a longitudinal axis and a transverse axis. The outer wall 2 of the bottle is formed by two opposite, plane or slightly outwardly bulged major, or face surfaces 11, and four somewhat shorter side surfaces 12, which form an angle $\beta$ with respect to each other. For ease of explanation, it will be assumed that the bottle stands up, and thus the cap 7 is placed at the top. The bottle has an outlet with a spout 16 formed with an external thread 5 (FIG. 6) on which the cap 7 can be screwed.

The bottom 3 has an upwardly extending or, as far as the bottle is concerned, inwardly directed projection 13, defining an essentially V-shaped region having two convex walls 18. The walls 18, in the region of the stand-up surface 4 (FIG. 5) of the bottle, is formed with rounded zones 14 which merge into the side walls 12, see FIG. 4. The apex of the V of the inward projection 13 forms an inner fold edge 8. The central region is straight, or only slightly curved or bowed and referred to herein and in the claims as "essentially straight" or "substantially straight". It extends in both directions in the form of curved portions 10 at the outer regions — see FIG. 5 — to form extensions of the essentially straight or only slightly curved bottom fold 8. The two curved portions 10 merge, roughly tangentially, in the longitudinal folds or fold lines 15. The longitudinal fold lines 15 form outer wall lines, extending longitudinally of the bottle.

The rounded bottom wall regions 14 form the transition from the convex wall regions 18 to the side walls 12 connecting fold lines 17. Upon compression of the side walls 11 towards each other, that is, when the bottle is folded flat, compare FIGS. 7 and 4, connecting fold lines 17 will form. The longitudinal fold lines 15 will form wall edges when the bottle is flat (FIG. 7); the two connecting lines or edges 17 form an inverted V or, with lines 15, a Y. The bottom inner fold edge 8, with the arcuate portion 10, and the longitudinal wall fold lines 15 are in the same longitudinal plane, passing also through the central axis of the bottle. The two side wall portions 12 which extend from the central axis of the bottle outwardly include the angle $\beta$ which, for example, has a value of between about 90°–140°, preferably 120°. The bottom wall regions 14 of the bottom wall portion 3 provide a stand-up surface length dimension a (FIG. 5) which is shorter than the dimension b measured across the bottle, from one longitudinal wall fold to the opposite one.

The upper part of the bottle, in the region of the spout, is curved and merges, unitarily, into a cylindrical spout 16, forming the neck of the bottle. The cylindrical spout 16 merges and continues into a pouring spout extension 19 which is coaxial to the central axis of the bottle. The pouring spout 19, reduced in diameter and cylindrical, is open at the outside, when the bottle is in use. The spout 16 has an external thread 5 on which a screw-on cap can be placed. The screw-on cap has an external cylindrical part 22 with an internal thread, meshing with the screw thread 5, and an upwardly extending conical portion which merges into a circular cover 24. A ring-shaped or sleeve-shaped internal extension 21 extends from the cover 24 into the interior of the pouring spout portion 19, to provide for a tight, essentially air-tight seal of the pouring spout 19 when the cap 7 is screwed on the thread 5. The diameter d of the spout portion 16 is usually less than ⅓, preferably about 1/6 of the largest transverse dimension of the bottle, shown as dimension b in FIG. 5.

Figure 4:
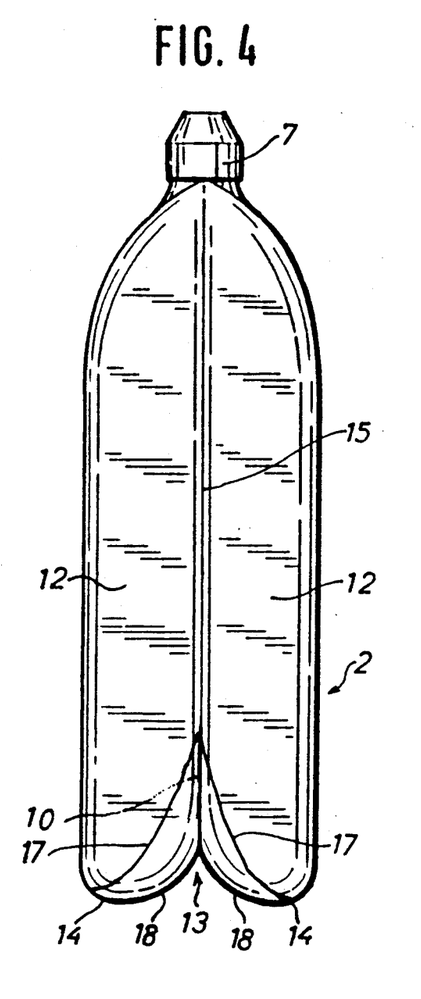
FIG. 4 is a side view of the bottle of FIG. 1.
Figure 5:
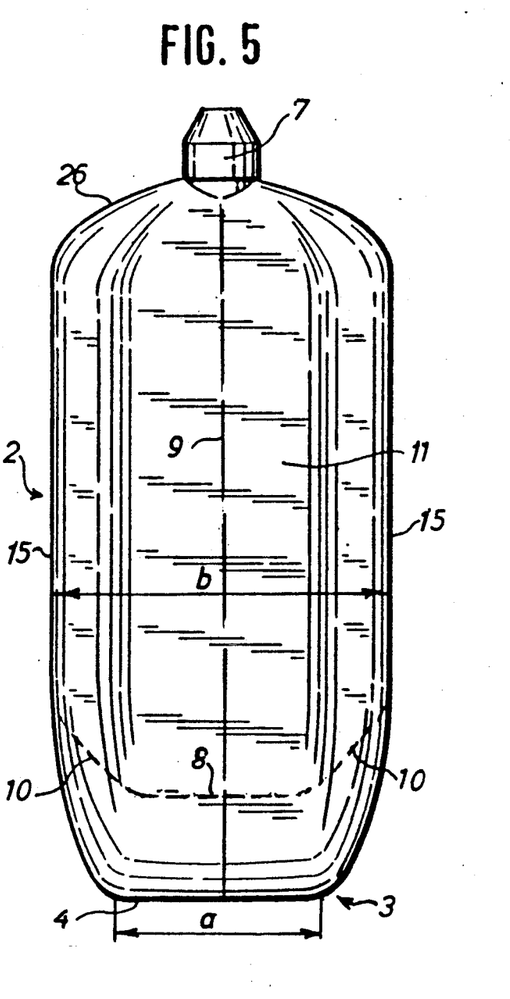
FIG. 5 is a front view of the bottle of FIG. 1.
Figure 6:
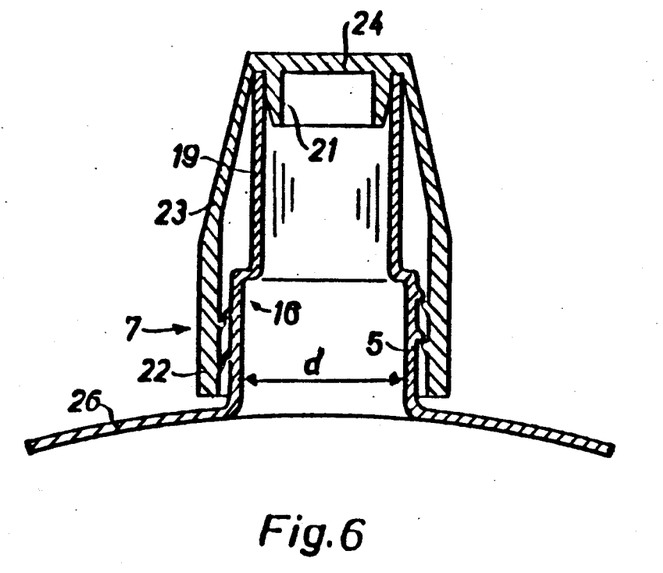
FIG. 6 is a sectional view of the outlet portion of the bottle, and illustrating a spout-and-cap arrangement.
Figure 7:
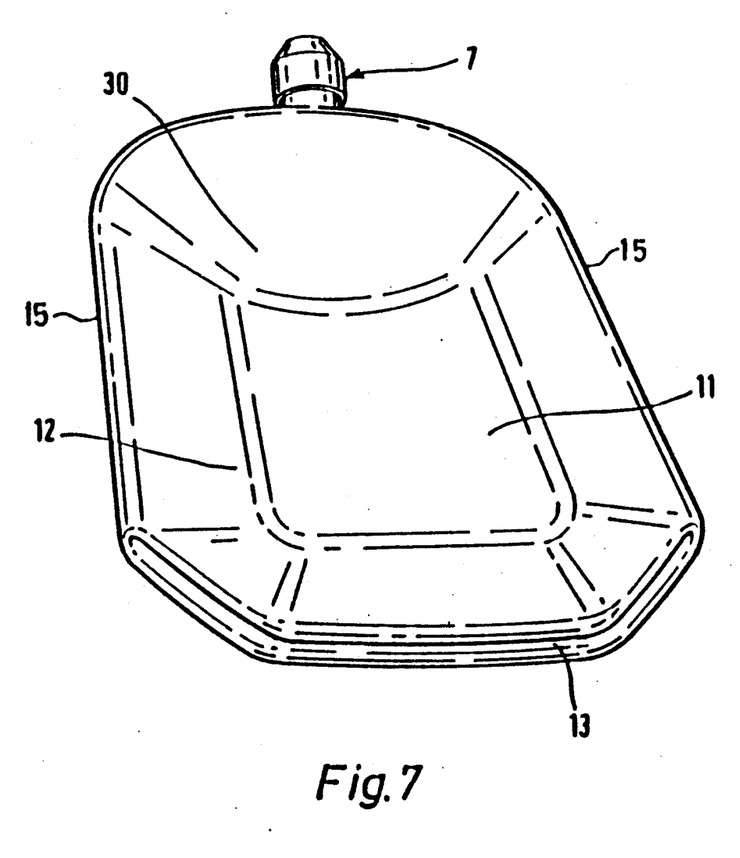
FIG. 7 is a perspective view of the bottle of FIG. 1, when empty, and folded together, for example for shipping.

The two opposite major or face surfaces 11 which either are flat or plane, or outwardly slightly curved or bulged, merge into a rounded portion 26 which, then, is joined to the neck 16. As best seen in FIG. 4, the upper portion of the bottle is generally saddle-shaped. The joint or connecting or seam line 9, which arises upon blow-molding in a two-part mold extends longitudinally of the bottle, and at the bottom part 3 is located transversely to the bottom fold edge 8. This junction seam 9 is in the center of the major or face surfaces 11. This placement of the juncture of the blow mold is in contrast to conventional bottles, and rotated by 90° with respect thereto. This shift permits increasing the number of the blow-molds which can be made simultaneously with respect to prior art production processes with the same machines and the same dimensions; thickening of materials at the fold lines is thereby avoided.

In one and preferred example, a bottle in accordance with FIG. 1, and having a content of 750 ml, had a height, including the neck and spout portion, of about 22 cm. The maximum width b was about 9 cm, the maximum thickness orthogonal to dimension b, about 6 cm. The wall thickness may be between 0.1 to 1.2 mm.

The bottle can stand upright on the bottom surface 4 due to its shape. When filled, and due to the comparatively low wall thickness, the bottle has a slight tendency to spread out at the lower end, due to the inwardly extending projection 13. This additionally improves the balance of the bottle and its stability, see dimension B, FIG. 4 which is orthogonal to dimension a, FIG 5.

The bottle is eminently suitable for customer presentation on shelves of stores and can also be reused for refill purposes To empty the bottle, the cap 7 is screwed off. The reduced size of the spout 19 permits introducing the spout into a bottle having a standard opening on which the screw top 7 can fit, so that the contents of the bottle can readily be transferred to another one.

After emptying the bottle, it can be collapsed due to the low wall thickness and the flexible material. Preferably, the bottle is made of plastic material which is only semi-rigid, or if reinforced, only reinforced in longitudinal direction Collapse of the bottle is preferably obtained by, for example, laying it flat on a surface such as a table and pressing it, for example with a hand flat on the surface 11. This compresses the V-shaped internal projection 13 along the preformed folding edge 8, 10. The two previously highly bent arcs at the end of fold line 8, 10 are somewhat stretched. In the region of the bottle close to the spout, the two half-sphere or cup-shaped portions 30 will fold into each other with closely adjacent wall portions — see FIG. 7.

The relatively small neck 16 — in relation to the diameter of the bottle — contributes to the formation of the half-cupped or half-shell portion 30 at the upper region of the bottle. Before completely compressing the bottle, the cap 7 should be slightly loosened and, to prevent re-expansion of the bottle due to resilient opening of the folds, the cap can be tightened to decrease its volume to a fraction of that when filled and maintain the collapsed condition by vacuum.

Figure 8:
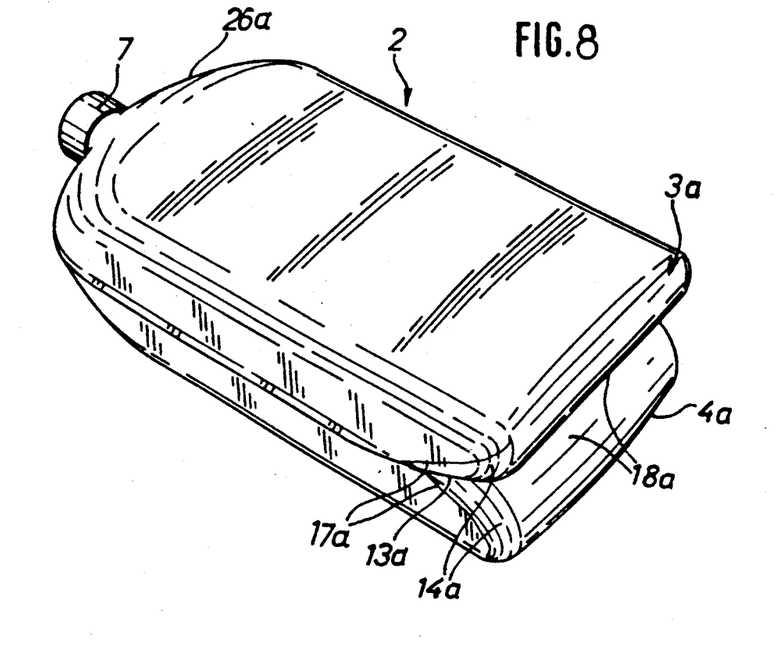
FIG. 8 is a perspective view of another embodiment of the bottle.
Figure 9:
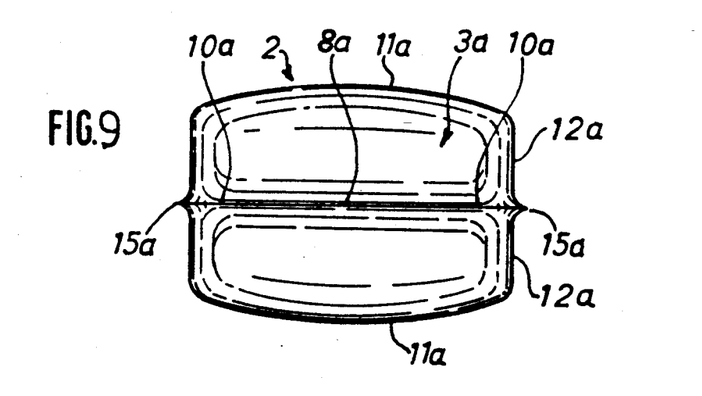
FIG. 9 is a bottom view of the bottle of FIG. 8.
Figure 10:
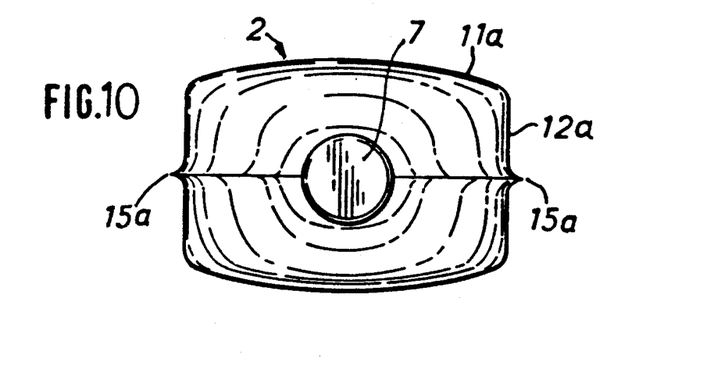
FIG. 10 is a top view of the bottle of FIG. 8.

The bottle of FIGS. 8-10 has a higher volume than that of the bottle of FIGS. 1-6. Its cross section, in general, is rectangular, see FIGS. 9 and 10 and may, for example, be square. The two longer major or face surfaces 11a are slightly outwardly bulged. The shorter side surfaces 12a are formed with the folding edges 15a, pre-formed to bulge outwardly, for example by providing a roughly triangular or slightly pointed extension, see FIGS. 9 and 10. The bottom 3a has a generally V-shaped internal projection 13a with convex walls 18a, merging towards an inner bottom fold 8a which, in turn, merges to the curved region 10a. At the transition between the inner projection 13a and the side walls 12a, connecting folds 17a (FIG. 8) will form which are rounded when the bottle is expanded, and define, in upright position, essentially inverted Y-shaped folding edges 17a. The folding edges 15a and the bottom folding edge 8a are in the same longitudinal plane of the bottle.

The upper or neck portion of the bottle has a round region 26a and merges into a neck, which can be identical to the neck 16 (FIGS. 1-7), closed off by a cap 7. The bottle folds similarly to that of FIG. 1-7 and to compress it the same method is used.

Figure 11:
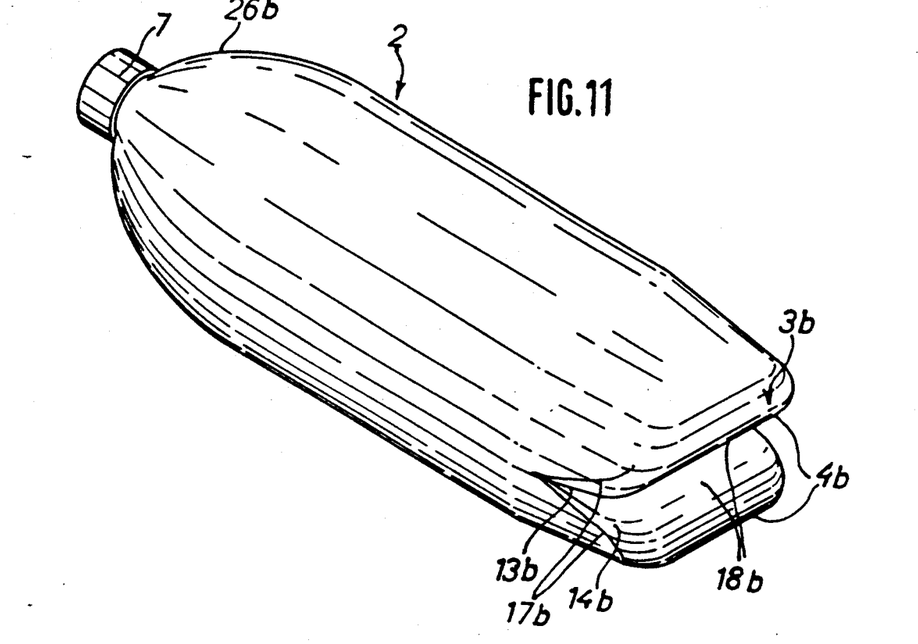
FIG. 11 is a perspective view of yet another embodiment of the bottle.
Figure 12:
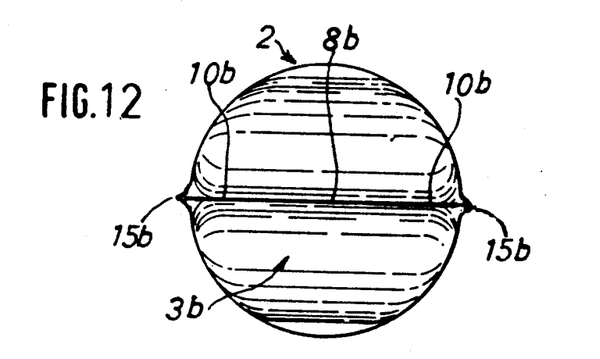
FIG. 12 is a bottom view of the bottle of FIG. 11.
Figure 13:
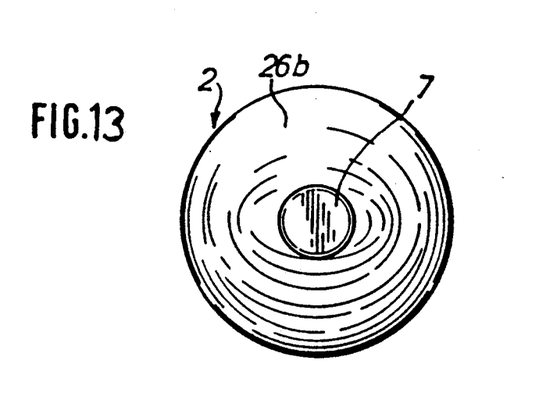
FIG. 13 is a top view of the bottle of FIG. 11.

FIGS. 11-13 illustrate another embodiment in which the bottle has a circular cross section. Folding edges 15b, projecting outwardly, are pre-formed, for example of an essentially triangular extension or reinforcement. The bottom 3b has the V-shaped internal projection 13b with covex walls 18b to define an inner folding edge 8b, merging at both sides into arcuate portions 10b. Connecting fold lines 17b form at the transition between the internal projection 13b and the wall surface 2 which, when the bottle is open or expanded, form inverted Y-shaped connecting fold lines. The folding edges or lines 15b and the internal fold line 8b are in the same longitudinal plane at the bottom. The upper part of the bottle merges into a rounded portion 16b which then is merged into the neck, which can be identical to that described in connection with FIGS. 1-7. A cap 7 closes off the bottle, which can be compressed as described in connection with FIGS. 1-7.

The bottle can be made of various types of materials, and particularly suitable materials are polyethylene, polypropylene, copolymers, and polyvinylchloride, the latter, however, being less suitable due to its environmentally undesirable characteristics.

Figure 14:
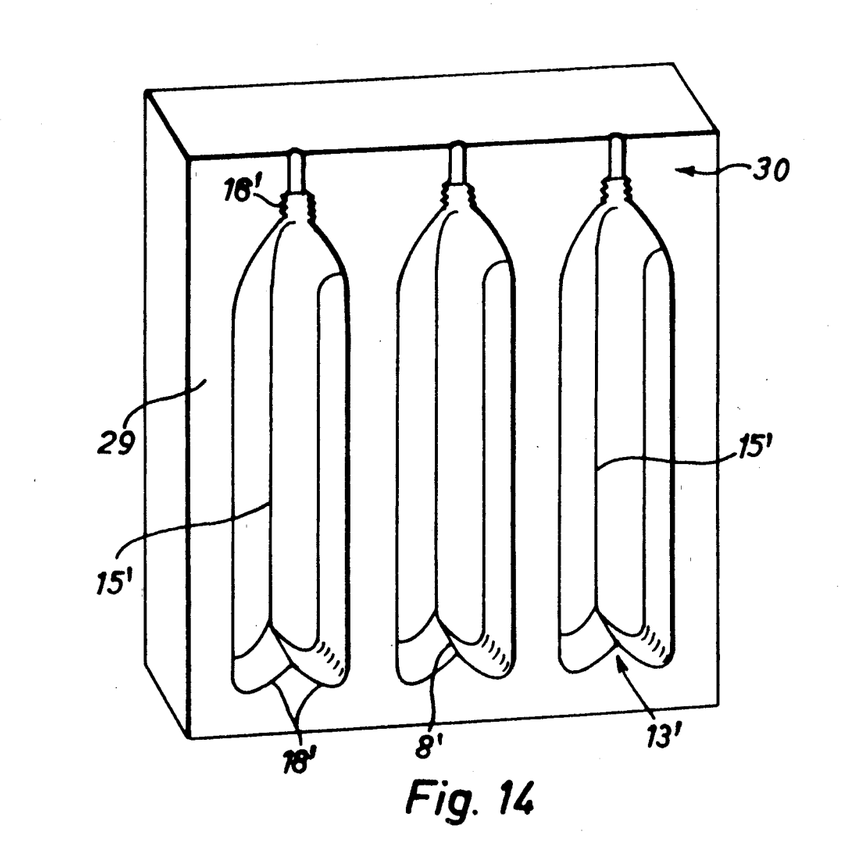
FIG. 14 is a perspective view of half of a blow mold for, for example, the bottle of FIGS. 1 through 7.

FIG. 14 shows half of a blow form, looking at the mold portion, in which the regions of the bottle are also shown Thus, the inwardly extending projection 13 for the bottle is shown at 13'; the rounded convex portions for the bottle 18 are shown on the mold form at 18'; the neck portion, with its thread, is shown on the mold form at 16'.

Figure 15:
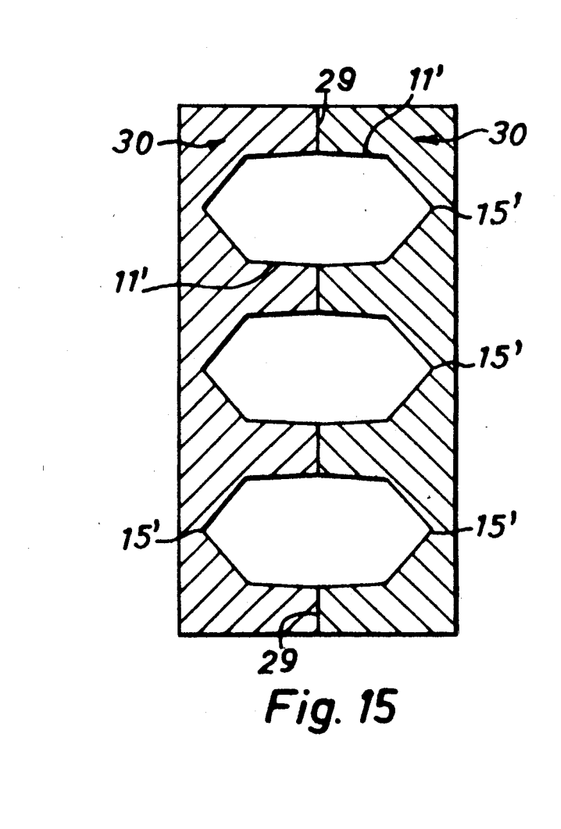
FIG. 15 is a cross-sectional view through two halves of a blow mold, in assembled relation to each other.

As can be seen, the mold half 30 of FIG. 14, when joined an identical mold half 30 at the junction surface 29, will make a complete bottle which, then, will have the mold junction line 29 (FIG. 15) extending transversely to the bottom fold line 8 of the bottle, reproducing the edge 8' of the mold, The folding edges 15 of the bottle are formed in a mold by the mold edges 15', and the face walls 11 of the bottle are formed by the mold surfaces 11'.

Various changes and modifications may be made, and any features disclosed herein may be used with any of the others, within the scope of the inventive concept.

I claim:

1. A collapsible and expandable blow-molded plastic bottle which is self-supporting when expanded, having a body (2) including a bottom portion (3, 4), adapted to support the bottle and contents thereof on a support surface;

a top portion (16, 26) including a pouring spout (16, 19);

two central face portions (11), and two pairs of side wall portion (12), wherein the body (2) is formed with two seam lines or junctions extending longitudinally of the bottle and generated upon blow-molding of the bottle, each of said pair of said side wall portions forming outwardly extending, in cross section essentially V-shaped side walls defining a longitudinally extending side fold line (15) at the apex of the outwardly directed V, and each of said pair of side wall portions (12) forming an angle (β) between each other and extending outwardly of said body (2), each said angle (β) opening in a direction toward the interior of the bottle;

wherein the bottom portion is formed with an inwardly extending, in cross section essentially inverted V-shaped folded part (13) defining an elongated inner bottom fold line (8) at the apex of the inwardly directed V, said inner bottom fold line (8) separating said bottom portion into two essentially parallel bottom wall regions (14);

wherein the bottom fold line (8) and the longitudinal side fold lines (15) are located in a single plane passing through a longitudinal axis of the bottle;

wherein said inner bottom fold line (8) comprises a central, essentially straight portion (8) and two lateral curved portions (10) which extend upwardly to meet and merge with said longitudinal side fold lines (15); and upon collapse of said bottle, inverted, essentially Y-shaped folding lines (17) will form, extending the bottom wall region (14) of the bottom portion (3) of the bottle.

2. The bottle of claim 1, wherein said inwardly extending V-shaped folded part (13) is formed by two essentially convex surfaces (18, 18a, 18b) forming part of the bottom wall (3, 3a, 3b), said bottom wall regions having lateral rounded end portions (14, 14a, 14b) merging into the face wall portions (11) of the body.

3. The bottle of claim 1, wherein the bottom wall regions (14) of said bottom portion (3, 3a, 3b) define a bottom support surface (4) which has a longitudinal extent (a) parallel to said inner bottom fold line (8), which is shorter than the distance (b) between the longitudinally extending side fold lines (15, 15a, 15b) when the bottle is erected and holds a substrate tending to spread said bottle apart.

4. The bottle of claim 1, wherein in cross section, the shape of the bottle in a region approximately midway of its longitudinal extent is generally hexagonal.

5. The bottle of claim 1, wherein, in cross section, the shape of the bottle in a region approximately midway of its longitudinal extent is essentially rectangular; and wherein said longitudinally extending side fold lines (15a) are preformed.

6. The bottle of claim 1, wherein, in cross section, the shape of the bottle in a region approximately midway of its longitudinal extent is essentially circular; and wherein said longitudinally extending side fold lines (15b) project diametrically outwardly and are preformed.

7. The bottle of claim 1, wherein said side wall portions (12) of each pair are unitary plastic elements devoid of a seam along the respective side fold line (15).

8. The bottle of claim 1, wherein said wall portions, said bottom portion (3, 4) and said top portion (16, 26) form a unitary element;

said longitudinally extending side fold lines (15, 15a, 15b) merge into the top portion and form rounded fold line end portions; and wherein a saddle-shaped portion is positioned transversely to said single plane passing through the bottom fold line (8) and the longitudinal fold lines (15), and located in the region of said top portion.

9. The bottle of claim 1, wherein the seam lines or junctions (9) of the body (2), generated upon blow-molding of the bottle, extend longitudinally of the bottle, transversely through said inner bottom fold line and are located within said two central face wall portions (11).

10. The bottle of claim 9, wherein said seam lines or junctions are located at least approximately in the middle between the longitudinally extending side fold lines (15, 15a, 15b).

11. The bottle of claim 1, wherein said pouring spout is coaxial to a central axis of the bottle and is formed with an outwardly threaded portion (5) and an adjacent outwardly extending cylindrical pouring spout part (19) having a diameter reduced with respect to the diameter of the outwardly threaded portion.

12. The bottle of claim 11, wherein the reduced diameter is less than ¼ and, optionally, about 1/6 of the maximum dimension (b) of the bottle from one longitudinal fold line (15) to the other and taken transversely to the longitudinal axis of the bottle.

13. A two-part blow mold for making a blow-molded bottle, as claimed in claim 1, wherein the seam lines or junctions (9) on the body (2) generated upon blow-molding of the bottle, extend longitudinally of the bottle, transversely through said inner bottom fold line (8) between the longitudinally extending fold lines (15) and separate from said fold lines (15);

said blow mold having two mold parts, said parts being joined at a junction surface (29) and, upon blow-molding of the bottle, forming said seam lines or junctions (9), said mold parts, each, being formed with a cavity, each of said cavities including a longitudinally extending groove line (15') to form, upon blow-molding of the bottle, said longitudinally extending fold lines (15).

14. The mold of claim 13, wherein said cavity is formed with an internal projection (8') to form, upon blow-molding of the bottle, said inner bottom fold line (8).

15. A method of reducing the volume of a collapsible blow-molded bottle, as claimed in claim 1, comprising the steps of exposing the interior of the bottle to ambient air;

compressing the bottom portion, body portion and top portion of the bottle towards each other to form a flat, two-ply structure closed at the bottom portion, with said inwardly extending V-shaped folded part (13) located between side walls of the bottom portion, said longitudinal fold lines (15, 15a, 15b) forming the extreme lateral portions of the collapsed bottle;

collapsing the body portion adjacent the top portion to form, essentially, a half-shell or half-cup shaped region (30); and sealing the pouring spout (16, 19) to prevent ingress of ambient air after collapse of the bottle and to prevent resilient spreading apart of the bottom portion and of the body portion due to elastic recovery of the material of the bottle.

16. Collapsible and expandable blow-molded plastic bottle having a body (2), said body having wall portions, a bottom portion (3a) and a top portion (16, 26) including a pouring spout;

wherein, in cross section, the shape of the bottle in the central region thereof is essentially rectangular, said wall portions having two central face portions (11a) and four side wall portions (12a), two, each, of the side wall portions, at their edges, defining longitudinal fold lines (15a) which are preformed and project outwardly of the bottle, and two seam lines or junctions (9) on the body, generated upon blow-molding of the bottle; wherein the bottom portion (3) is formed with an inwardly extending, in cross section essentially inverted V-shaped folded part (13) defining an elongated inner bottom fold line (8a) at the apex of the V;

wherein the inner bottom fold line (8a) and the longitudinal fold lines (15a) are located in a single plane passing through a longitudinal axis of the bottle;

wherein said elongated inner bottom fold line comprises a central, substantially straight portion (8) and two lateral portions (10a), extending upwardly to directly meet said longitudinal fold lines (15a); and wherein said inwardly extending V-shaped folded part (13) defines two essentially convex surfaces (18a) forming part of the bottom portion (3a) and having lateral rounded end portions (14a), said rounded end portions (14a) merging into the body portion (2) and being located at opposite sides of said single plane.

17. The bottle of claim 16, wherein the bottom wall regions (14) of said bottom portion (3, 3a, 3b) define a bottom support surface (4) which has a longitudinal extent (a), parallel to said inner bottom fold line (8), which is shorter than the distance (b) between the longitudinally extending side fold lines (15, 15a, 15b) when the bottle is erected and holds a substance tending to spread said bottle apart.

18. The bottle of claim 16, wherein the seam lines or junctions (9) of the body (2), generated upon blow-molding of the bottle, extend longitudinally of the bottle, transversely through said inner bottom fold line and are located within said two central face wall portions (11).

19. A two-part blow mold for making a blow-molded bottle, as claimed in claim 16, wherein the seam lines or junctions (9) on the body (2) generated upon blow-molding of the bottle, extend longitudinally of the bottle, transversely through said inner bottom fold line (8) between the longitudinally extending fold lines (15) and separate from said fold lines (15);

said blow mold having two mold parts, said parts being joined at a junction surface (29) and, upon blow-molding of the bottle, forming said seam lines or junctions (9), said mold parts, each, being formed with a cavity, each of said cavities including a longitudinally extending groove line (15') to form, upon blow-molding of the bottle, said longitudinally extending fold lines (15).

20. Collapsible, blow-molded plastic bottle having a body (2) having wall portions;

a bottom portion (3b); and a top portion (2b) including a pouring spout (16, 19), wherein, in cross section, the shape of the bottle in a central region thereof is essentially circular;

longitudinal side fold lines (15b) which are preformed and project outwardly of the bottle and located diametrically opposite each other;

two seal lines or junctions (9) on the body, generated upon blow-molding of the bottle;

the bottom portion (3b) is formed with an inwardly extending, in cross section essentially inverted V-shaped folded part (13b) defining an elongated inner bottom fold line (8b) at the apex of the V;

wherein the bottom fold line (8b) and the longitudinal side fold lines (15b) are located in a single plane passing through a longitudinal axis of the bottle; and wherein said elongated inner bottom fold line (8b) comprises a central, substantially straight portion and two lateral portions (10b), extending upwardly to directly meet said longitudinal fold lines; and wherein said inwardly extending V-shaped folded part (13b) defines two essentially convex surfaces (18b) forming part of the bottom wall (3b) and having lateral rounded end portions (14b), said rounded end portions (14b) merging into the body (2) and being located at opposite sides of said single plane.

21. The bottle of claim 20, wherein said seam lines or junctions (9) of the body (2) generated upon blow-molding of the bottle extend longitudinally of the bottle, transversely to said inner bottom fold line (8b) and are located on the wall portions of the bottle separate from said longitudinal side fold lines (15b).

22. The bottle of claim 20, wherein said longitudinal seam lines or junctions (9) are located approximately in the middle between the longitudinally extending side fold lines (15b).

23. The bottle of claim 20, wherein said rounded end portions (14b) of said bottom portion (3b) defines a bottom support surface (4) which has a longitudinal extent (a), parallel to said inner bottom fold line (8) which is shorter than the distance (b) between the longitudinally extending side fold lines (15b) when the bottle is erected and holds a substance tending to spread said bottle apart.

24. A two-part blow mold for making a blow-molded bottle, as claimed in claim 20, wherein the seam lines or junctions (9) on the body (2) generated upon blow-molding of the bottle, extend longitudinally of the bottle, transversely through said inner bottom fold line (8) between the longitudinally extending fold lines (15) and separate from said fold lines (15);

said blow mold having two mold parts, said parts being joined at a junction surface (29) and, upon blow-molding of the bottle, forming said seam lines or junctions (9), said mold parts, each, being formed with a cavity, each of said cavities including a longitudinally extending groove line (15') to form, upon blow-molding of the bottle, said longitudinally extending fold lines (15).

* * * * *